US012600055B2

(12) United States Patent
Du et al.

(10) Patent No.: US 12,600,055 B2
(45) Date of Patent: Apr. 14, 2026

(54) HOLLOW ARTIFICIAL LOG AND MANUFACTURING METHOD THEREFOR

(71) Applicant: Southwest Forestry University, Kunming (CN)

(72) Inventors: Guanben Du, Kunming (CN); Chunlei Dong, Kunming (CN)

(73) Assignee: Southwest Forestry University, Kunming (CN)

( * ) Notice: Subject to any disclaimer, the term of this patent is extended or adjusted under 35 U.S.C. 154(b) by 401 days.

(21) Appl. No.: 18/383,361

(22) Filed: Oct. 24, 2023

(65) Prior Publication Data

US 2024/0139989 A1 May 2, 2024

(30) Foreign Application Priority Data

Oct. 26, 2022 (CN) ......................... 202211318364.5

(51) Int. Cl.
*B27D 1/10* (2006.01)
*B27D 3/00* (2006.01)
*B27M 1/08* (2006.01)

(52) U.S. Cl.
CPC ................. *B27D 1/10* (2013.01); *B27D 3/00* (2013.01); *B27M 1/08* (2013.01)

(58) Field of Classification Search
CPC ... B27D 1/10; B27D 1/04; B29C 3/00; B27M 1/08
USPC .......................................................... 156/184
See application file for complete search history.

(56) References Cited

U.S. PATENT DOCUMENTS 11,000,967 B2 * 5/2021 Stopfer .................... B27D 1/08

FOREIGN PATENT DOCUMENTS

| | | | |
|---|---|---|---|
| CN | 1718387 | A | 1/2006 |
| CN | 101302412 | A | 11/2008 |
| CN | 102658569 | A | 9/2012 |
| CN | 206326704 | U | 7/2017 |
| CN | 206327704 | U | 7/2017 |
| CN | 107119854 | A | 9/2017 |
| CN | 206926273 | U | 1/2018 |

OTHER PUBLICATIONS

Chinese Office Action dated Mar. 6, 2023 in corresponding Chinese Application No. 202211318264.5, 22 pages.
GB50329-2002 Standard for methods testing of timber structures, 161 pages.

* cited by examiner

*Primary Examiner* — James D Sells
(74) *Attorney, Agent, or Firm* — Harness, Dickey & Pierce, P.L.C.

(57) ABSTRACT

Disclosed are a hollow artificial log and a manufacturing method thereof. The method includes: splicing and fixing veneers along a length direction and a width direction, respectively, to obtain a spliced veneer; gluing the spliced veneer on one side to obtain a glued veneer; subjecting the glued veneer to winding and forming around a forming die along a length direction of the glued veneer to obtain a formed body; subjecting the formed body to hot-pressing curing in a hot-pressing die to obtain a cured body; and taking out the cured body from the forming die to obtain the hollow artificial log; wherein an adhesive for the gluing comprises a melamine-urea-formaldehyde copolycondensation resin, and the forming die is a cylinder.

20 Claims, 3 Drawing Sheets

HOLLOW ARTIFICIAL LOG AND MANUFACTURING METHOD THEREFOR

CROSS-REFERENCE TO RELATED APPLICATION

This patent application claims the benefit and priority of Chinese Patent Application No. CN202211318364.5 filed with the China National Intellectual Property Administration on Oct. 26, 2022, and entitled with "HOLLOW ARTIFICIAL LOG AND MANUFACTURING METHOD THEREFOR", the disclosure of which is incorporated by reference herein in its entirety as part of the present application.

TECHNICAL FIELD

The present disclosure belongs to the technical field of wood processing, and in particular to a hollow artificial log and a manufacturing method thereof.

BACKGROUND

Logs have been used as building components, such as building supports, for thousands of years. Wood components have unparalleled safety and comfort. For example, wood will oxidize and catch fire and burn at high temperature, with the burning, the surface will be carbonized to form a protective layer that plays a role of oxygen block and heat conduction, so the carbonization speed of large-section wood in burning is slow, and the strength loss is also slow. Therefore, under the burning condition, the safety of wooden structural components is better than other components. In addition, the wooden structural components can effectively absorb the stress concentration caused by the deformation of building structures during earthquake, which is conducive to alleviating the damage caused by earthquake.

Chinese patent CN200510088940.1 discloses an artificial log and a manufacturing method thereof. The artificial log includes a cylindrical wooden core and multiple layers of veneers rolled into a cylindrical shape around the wooden core. However, the artificial log prepared by the above patent is not only heavy and inconvenient to transport, but also has poor bonding strength between the multiple layers of veneers, large warpage and poor aesthetics and practicality.

SUMMARY

An object of the present disclosure is to provide a hollow artificial log and a manufacturing method thereof. The hollow artificial log obtained by the manufacturing method provided by the present disclosure has a hollow structure and a light weight. Moreover, the artificial log can be used not only for interior decoration, but also for building structural members such as supporting columns, due to its small warpage, high modulus of elasticity and high strength.

In order to achieve the above object, the present disclosure provides the following technical solutions:

The present disclosure provides a method for manufacturing a hollow artificial log, including splicing and fixing veneers along a length direction and a width direction, respectively, to obtain a spliced veneer; gluing the spliced veneer on one side to obtain a glued veneer; subjecting the glued veneer to winding and forming around a forming die along a length direction of the glued veneer to obtain a formed body; subjecting the formed body to hot-pressing curing in a hot-pressing die to obtain a cured body; and taking out the cured body from the forming die to obtain the hollow artificial log; wherein an adhesive for the gluing includes a melamine-urea-formaldehyde copolycondensation resin, and the forming die is a cylinder.

In some embodiments, the hot-pressing curing is conducted at a pressure of 1.5-5 MPa; during the hot-pressing curing, the hot-pressing die is at a temperature of 170-200° C.; and the hot-pressing curing is maintained at the pressure and the temperature for 20-30 min.

In some embodiments, the melamine-urea-formaldehyde copolycondensation resin is prepared by copolycondensation reaction of melamine, urea and formaldehyde; a mass of the melamine accounts for 20-25% of a total mass of the urea and melamine; and the melamine-urea-formaldehyde copolycondensation resin has a solid content of 60-65%.

In some embodiments, the adhesive further includes a curing agent; the curing agent includes one or more selected from the group consisting of ammonium chloride, ammonium sulfate, vinyl acetate emulsion, vinyl acetate copolymer emulsion, and isocyanate; and a mass of the curing agent accounts for 3-10% of a mass of the melamine-urea-formaldehyde copolycondensation resin.

In some embodiments, the glued veneer has a glue spread amount on the one side of 100-200 g/$m^2$.

In some embodiments, the veneers each have a density of 450 kg/$m^2$, a thickness of 1.5-2.5 mm, and a moisture content of less than or equal to 10%.

In some embodiments, under a condition of splicing along the length direction, the veneers are spliced according to a long grain; and under a condition of splicing along the width direction, the veneers are spliced according to a cross grain.

In some embodiments, gluing the spliced veneer on the one side is conducted by a movable roller glue spreader, a glue dispenser, or a glue sprayer.

The present disclosure provides a forming pressing device used in the method for manufacturing the hollow artificial log described as above technical solutions, including: a forming unit, arranged for forming the spliced veneer to obtain the formed body; and a pressing unit, arranged for subjecting the formed body to the hot-pressing curing to obtain the cured body, wherein the forming unit comprises: a first rack 1; a pneumatic compression roller subassembly 2 fixedly connected to the first rack 1; and a forming die 3, which is rotatably connected to the first rack 1 through a center shaft 16 and is fixedly connected to the center shaft 16; the center shaft 16 is rotatably connected to the first rack 1; the forming die 3 is a cylinder die; the pneumatic compression roller subassembly 2 is distributed around a side surface of the forming die 3, and are arranged for winding and forming the spliced veneer around the forming die 3; the pressing unit comprises: a second rack 4; a pressurized oil cylinder 5 fixedly connected to the second rack 4; an upper pressure hot plate 6, which is fixedly connected to a piston rod of the pressurized oil cylinder 5, and forms a first semi-cylindrical pressure groove; a support column 7, which is fixedly connected to the second rack 4 and is movably connected to the upper pressure hot plate 6; and a lower pressure hot plate 8, which is fixedly connected to the support column 7 and forms a second semi-cylindrical pressure groove; and wherein the second semi-cylindrical pressure groove is opposite to the first semi-cylindrical pressure groove.

The present disclosure provides a hollow artificial log manufactured by the method described as above technical solutions, having a warpage less than or equal to 5 mm/m.

The method for manufacturing the hollow artificial log provided by the present disclosure includes: splicing and fixing veneers along a length direction and a width direction, respectively, to obtain a spliced veneer; gluing the spliced veneer on one side to obtain a glued veneer; subjecting the glued veneer to winding and forming around a forming die along a length direction of the glued veneer to obtain a formed body; subjecting the formed body to hot-pressing curing in a hot-pressing die to obtain a cured body; and taking out the cured body from the forming die to obtain the hollow artificial log; wherein an adhesive for the gluing includes a melamine-urea-formaldehyde copolycondensation resin, and the forming die is a cylinder.

According to the method provided by the present disclosure, the melamine-urea-formaldehyde copolycondensation resin is used as the adhesive to enhance the bonding strength between the veneers for splicing, effectively improve the mechanical strength and modulus of elasticity of the artificial log obtained by hot-pressing curing, reduce the warpage of the artificial log, and improve the surface smoothness of the artificial log. Meanwhile, after the glued spliced veneer is subjected to forming and hot-pressing curing in the forming die, the deforming is conducted to obtain the hollow artificial log, and the mass of the artificial log is reduced. In conclusion, the hollow artificial log obtained by the manufacturing method according to the present disclosure has a hollow structure and a light weight. Moreover, the artificial log can be used not only for interior decoration, but also for building structural members such as supporting columns, due to its small warpage, high modulus of elasticity and high strength.

In some embodiments of the present disclosure, the hot-pressing curing is conducted at a pressure of 1.5-5 MPa; during the hot-pressing curing, the hot-pressing die is at a temperature of 170-200° C.; and the hot-pressing curing is maintained at the pressure and the temperature for 20-30 min. By controlling the operating parameters of the hot-pressing curing and using the melamine-urea-formaldehyde copolycondensation resin as the adhesive, the mechanical strength and modulus of elasticity of the artificial log obtained by hot-pressing curing are effectively improved, the warpage of the artificial log is reduced, and the surface smoothness of the artificial log is improved.

In some embodiments of the present disclosure, the melamine-urea-formaldehyde copolycondensation resin is prepared by copolycondensation reaction of melamine, urea and formaldehyde; a mass of the melamine accounts for 20-25% of a total mass of the urea and melamine; and the melamine-urea-formaldehyde copolycondensation resin has a solid content of 60-65%. In the present disclosure, by regulating the mass ratio of melamine monomer, urea monomer and formaldehyde monomer in the melamine-urea-formaldehyde copolycondensation resin, the bonding capacity of the melamine-urea-formaldehyde copolycondensation resin to the spliced veneer can be effectively improved, the mechanical strength and modulus of elasticity of the artificial log obtained by hot-pressing curing are effectively improved, the warpage of the artificial log is reduced, and the surface smoothness of the artificial log is improved.

In some embodiments of the present disclosure, the adhesive further includes a curing agent; the curing agent includes one or more selected from the group consisting of ammonium chloride, ammonium sulfate, vinyl acetate emulsion, vinyl acetate copolymer emulsion, and isocyanate; and a mass of the curing agent accounts for 3-10% of a mass of the melamine-urea-formaldehyde copolycondensation resin. In the present disclosure, the curing agent is matched with the melamine-urea-formaldehyde copolycondensation resin for use, so that the bonding ability of the melamine-urea-formaldehyde copolycondensation resin to the spliced veneer can be effectively improved, the mechanical strength and modulus of elasticity of the artificial log obtained by hot-pressing curing are effectively improved, the warpage of the artificial log is reduced, and the surface smoothness of the artificial log is improved.

The present disclosure provides a forming pressing device used in the method for manufacturing a hollow artificial log as described in the above technical solutions, including: a forming unit, arranged for forming the spliced veneer to obtain the formed body; and a pressing unit, arranged for subjecting the formed body to the hot-pressing curing to obtain the cured body, wherein the forming unit comprises: a first rack 1; a pneumatic compression roller subassembly 2 fixedly connected to the first rack 1; and a forming die 3, which is rotatably connected to the first rack 1 through a center shaft 16 and is fixedly connected to the center shaft 16; the center shaft 16 is rotatably connected to the first rack 1; the forming die 3 is a cylinder die; the pneumatic compression roller subassembly 2 is distributed around a side surface of the forming die 3, and are arranged for winding and forming the spliced veneer around the forming die 3; the pressing unit comprises: a second rack 4; a pressurized oil cylinder 5 fixedly connected to the second rack 4; an upper pressure hot plate 6, which is fixedly connected to a piston rod of the pressurized oil cylinder 5, and forms a first semi-cylindrical pressure groove; a support column 7, which is fixedly connected to the second rack 4 and is movably connected to the upper pressure hot plate 6; and a lower pressure hot plate 8, which is fixedly connected to the support column 7 and forms a second semi-cylindrical pressure groove; and wherein the second semi-cylindrical pressure groove is opposite to the first semi-cylindrical pressure groove. The forming pressing device provided by the present disclosure can effectively control the forming and hot-pressing curing of the spliced veneer, specifically as follows: by using the forming unit provided by the present disclosure, when the spliced veneer is wound by the pneumatic compression roller subassembly 2, the applied pressure makes the layers of the spliced veneer more compact when the spliced veneer is wound on the surface of the forming die 3. By using the pressing unit applied by the present disclosure, uniform and stable hot pressure is provided to the formed body by the upper pressure hot plate and the lower pressure hot plate, which can effectively promote the rapid curing of the adhesive, so that the mechanical strength and modulus of elasticity of the artificial log obtained by hot-pressing curing are effectively improved, the warpage of the artificial log is reduced, and the surface smoothness of the artificial log is improved.

BRIEF DESCRIPTION OF THE DRAWINGS

In FIG. 1: 1—first rack, 2—pneumatic compression roller subassembly, 3—forming die, 4—second rack, 5—pressurized oil cylinder, 6—upper pressure hot plate, 7—support column, 8—lower pressure hot plate, 9—rolling wheel row, 10—first heat conducting medium inlet-outlet pipe, 11—second heat conducting medium inlet-outlet pipe, 12—spliced veneer, 16—center shaft, 17—handle.

In FIG. 2: 13—veneer, 14—seam, 15—hot melt adhesive tape.

DETAILED DESCRIPTION OF THE EMBODIMENTS

A method for manufacturing a hollow artificial log is provided by the present disclosure, including:

- splicing and fixing veneers along a length direction and a width direction, respectively, to obtain a spliced veneer;
- gluing the spliced veneer on one side to obtain a glued veneer;
- subjecting the glued veneer to winding and forming around a forming die along a length direction of the glued veneer to obtain a formed body;
- subjecting the formed body to hot-pressing curing in a hot-pressing die to obtain a cured body; and
- taking out the cured body from the forming die to obtain the hollow artificial log;
- wherein an adhesive for the gluing includes a melamine-urea-formaldehyde copolycondensation resin, and
- the forming die is a cylinder.

In the present disclosure, unless otherwise specified, all preparation raw materials/components are commercially available products that are well known to those skilled in the art.

In the present disclosure, veneers are spliced and fixed along a length direction and a width direction, respectively, to obtain a spliced veneer.

In some embodiments of the present disclosure, the veneers are one member selected from the group consisting of a fast-growing poplar veneer, a fast-growing eucalyptus veneer, and a *Pinus sylvestris* veneer.

In some embodiments of the present disclosure, the veneers each have a density of 450-500 kg/m$^2$; the veneers each have a thickness of 1.5-2.5 mm, preferably 2 mm; and the veneers each have a moisture content of less than or equal to 10%, preferably 6%-10%.

In some embodiments of the present disclosure, the veneers each have a dimension of 1200 mm×40 mm×2.0 mm.

In some embodiments of the present disclosure, under a condition of splicing along the length direction, the veneers are spliced according to a long grain; and under a condition of splicing along the width direction, the veneers are spliced according to a cross grain.

In some embodiments of the present disclosure, when splicing, the veneers are spliced after misaligned assembly, that is, the seams of the veneers are misaligned with each other.

In some embodiments of the present disclosure, the fixing is achieved by using a hot melt adhesive tape to bond and fix the veneers after assembling, so as to obtain the spliced veneer.

In some embodiments of the present disclosure, the splicing is conducted in a splicing machine.

In some embodiments of the present disclosure, the hot melt adhesive tape is free of overlapping with any seam of the veneers.

Figure 2:
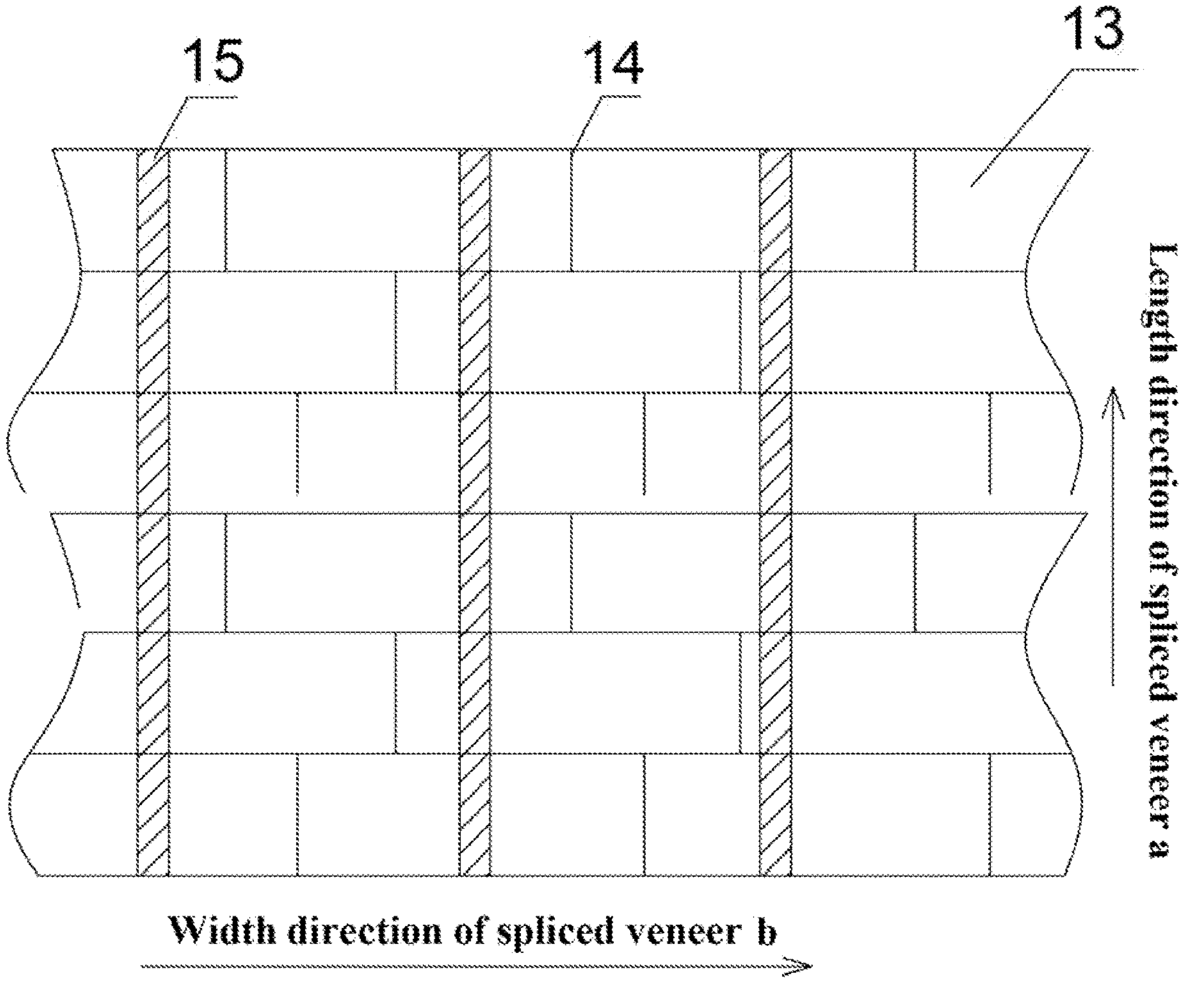
FIG. 2 shows a structural schematic diagram of the spliced veneer provided according to an example of the present disclosure.

A structural schematic diagram of the spliced veneer prepared according to the present disclosure is shown in FIG. 2. In FIG. 2, 13 represents a veneer, 14 represents a seam, and 15 represents a hot melt adhesive tape.

In the present disclosure, after the spliced veneer is obtained, the spliced veneer is glued on one side to obtain a glued veneer; wherein an adhesive for the gluing includes a melamine-urea-formaldehyde copolycondensation resin.

In some embodiments of the present disclosure, the melamine-urea-formaldehyde copolycondensation resin is prepared by copolycondensation reaction of melamine, urea and formaldehyde; a mass of the melamine accounts for 20-25% of a total mass of urea and melamine, preferably 21-24%; and the melamine-urea-formaldehyde copolycondensation resin has a solid content of 60-65%, preferably 61-63%.

In some embodiments of the present disclosure, the melamine-urea-formaldehyde copolycondensation resin (MUF resin) is prepared by a process including the following steps:

- adjusting a pH value of a formaldehyde aqueous solution to 9-9.5, and then subjecting the adjusted formaldehyde aqueous solution, a part of urea, and a part of melamine to first mixing to obtain a first solution;
- adjusting a pH value of the first solution to 4.5-7.5 and subjecting the adjusted first solution to heat preservation to obtain a second solution;
- adjusting a pH value of the second solution to 8.5-9.5, and subjecting the adjusted second solution, and the rest melamine to second mixing to obtain a third solution; and
- adjusting a pH value of the third solution to 8.5-9.5, and subjecting the adjusted third solution, and the rest urea to third mixing to obtain the melamine-urea-formaldehyde copolycondensation resin.

In the present disclosure, a pH value of a formaldehyde aqueous solution is adjusted to 9-9.5, and then the adjusted formaldehyde aqueous solution, a part of urea, and a part of melamine are subjected to first mixing to obtain a first solution. In some embodiments the mass present disclosure, a mass concentration of the formaldehyde aqueous solution is 35-39%, preferably 37%. In some embodiments of the present disclosure, a mass of the part of urea accounts for 45-55% of a total urea, preferably 50%. In some embodiments of the present disclosure, a mass of the part of melamine accounts for 45-55% of a total melamine, preferably 50%. In some embodiments of the present disclosure, a mass ratio of the formaldehyde aqueous solution to the part of urea is in a range of 100: 20-30, preferably 100: 25. In some embodiments of the present disclosure, a mass ratio of the formaldehyde aqueous solution to the part of melamine is in a range of 100: 8-12, preferably 100: 10. There is no special requirements on the pH regulator for adjusting the pH value of formaldehyde aqueous solution, as long as the required pH value can be met.

In some embodiments of the present disclosure, the first mixing is conducted under a stirring condition, and the stirring is conducted at a rotational speed of 60-80 r/min, preferably 65-70 r/min. In some embodiments of the present disclosure, the first mixing is performed by low-temperature mixing and high-temperature mixing in sequence; the low-temperature mixing is conducted at room temperature, and the room temperature is 20-35° C., preferably 25-30° C.; the low-temperature is conducted for 10-30 min, preferably 15-25 min. In some embodiments of the present disclosure, the high-temperature mixing is conducted at a temperature of 90-95° C., preferably 92-94° C., and the high-temperature mixing is conducted for 20-60 min, preferably 30-50 min.

In the present disclosure, after the first solution is obtained, a pH value of the first solution is adjusted to 4.5-7.5, and the adjusted first solution is subjected to heat preservation to obtain a second solution. In some embodiments of the present disclosure, the heat preservation is conducted at a temperature of 90-95° C., preferably 92-94° C., and the heat preservation is conducted for 30-120 min, preferably 50-100 min.

In the present disclosure, after the second solution is obtained, a pH value of the second solution is adjusted to 8.5-9.5, and the adjusted second solution, and the rest melamine are subjected to second mixing to obtain a third solution. There is no special requirements on the pH regulator for adjusting the pH value of formaldehyde aqueous solution, as long as the required pH value can be met. In some embodiments of the present disclosure, the second mixing is conducted at a temperature of 85-90° C., preferably 86-88° C., and the second mixing is conducted for 30-60 min, preferably 40-50 min.

In the present disclosure, after the third solution is obtained, a pH value of the third solution is adjusted to 8.5-9.5, and the adjusted third solution, and the rest urea are subjected to third mixing to obtain the melamine-urea-formaldehyde copolycondensation resin. There is no special requirements on the pH regulator for adjusting the pH value of formaldehyde aqueous solution, as long as the required pH value can be met. In some embodiments of the present disclosure, the third mixing is conducted at a temperature of 60-65° C., preferably 62-64° C., and the second mixing is conducted for 20-50 min, preferably 30-40 min.

In the present disclosure, after the third mixing, the method further includes cooling the product obtained after the third mixing. In some embodiments of the present disclosure, the temperature after cooling is room temperature, and the room temperature is 20-35° C., preferably 25-30° C. There is no special requirements on the cooling mode, as long as the cooling temperature can be met.

In the present disclosure, the melamine-urea-formaldehyde copolycondensation resin has good waterproof performance and high bonding strength. The weather resistance and water resistance of artificial sawn timber can be improved by using the melamine-urea-formaldehyde copolycondensation resin as the adhesive.

In some embodiments of the present disclosure, the glued veneer has a glue spread amount on the one side of 100-200 g/m$^2$, preferably 120-185 g/m$^2$.

In some embodiments of the present disclosure, the adhesive further includes a curing agent; the curing agent includes one or more selected from the group consisting of ammonium chloride, ammonium sulfate, vinyl acetate emulsion, vinyl acetate copolymer emulsion, and isocyanate; and a mass of the curing agent accounts for 3-10% of a mass of the melamine-urea-formaldehyde copolycondensation resin, preferably 3.5-8%.

In some embodiments of the present disclosure, gluing the spliced veneer on the one side is conducted by a movable roller glue spreader, a glue dispenser, or a glue sprayer. In some embodiments of the present disclosure, the movable roller glue spreader, glue dispenser, or glue sprayer is used for gluing the spliced veneer on the one side of the spliced veneer, which can effectively prevent the spliced veneer from tearing during gluing, and is more suitable for the spliced veneer with longer length in the present disclosure.

In the present disclosure, after the glued veneer is obtained, the glued veneer is subjected to winding and forming around a forming die along a length direction of the glued veneer to obtain a formed body; wherein the forming die is a cylinder.

In some embodiments of the present disclosure, the forming die is a solid cylinder, or a hollow cylinder.

In some embodiments of the present disclosure, before winding and forming, a release agent is coated on a surface of the forming die to facilitate subsequent removal.

After the formed body is obtained, the formed body is subjected to hot-pressing curing in a hot-pressing die along a diameter direction of the formed body to obtain a cured body.

In some embodiments of the present disclosure, the hot-pressing curing is conducted at a pressure of 1.5-5 MPa, preferably 2-4.5 MPa; during the hot-pressing curing, the hot-pressing die is at a temperature of 170-200° C., preferably 175-195° C.; and the hot-pressing curing is maintained at the pressure and the temperature for 20-30 min, preferably 22-26 min.

After the cured body is obtained, the hollow artificial log is obtained after taking out the cured body from the forming die.

There is no special requirements on the specific embodiments of removing the forming die.

The present disclosure provides a forming pressing device used in the method for manufacturing the hollow artificial log described as the above technical solutions, including:

a forming unit, arranged for forming the spliced veneer to obtain the formed body; and a pressing unit, arranged for subjecting the formed body to the hot-pressing curing to obtain the cured body, wherein the forming unit comprises:

a first rack 1;

a pneumatic compression roller subassembly 2 fixedly connected to the first rack 1; and a forming die 3, which is rotatably connected to the first rack 1 through a center shaft 16 and is fixedly connected to the center shaft 16; the center shaft 16 is rotatably connected to the first rack 1; the forming die 3 is a cylinder die; the pneumatic compression roller subassembly 2 is distributed around a side surface of the forming die 3, and are arranged for winding and forming the spliced veneer around the forming die 3;

the pressing unit comprises:

a second rack 4;

a pressurized oil cylinder 5 fixedly connected to the second rack 4;

an upper pressure hot plate 6, which is fixedly connected to a piston rod of the pressurized oil cylinder 5, and forms a first semi-cylindrical pressure groove;

a support column 7, which is fixedly connected to the second rack 4 and is movably connected to the upper pressure hot plate 6; and a lower pressure hot plate 8, which is fixedly connected to the support column 7 and forms a second semi-cylindrical pressure groove.

The forming pressing device provided by the present disclosure includes a forming unit, arranged for forming the spliced veneer to obtain the formed body.

Figure 1:
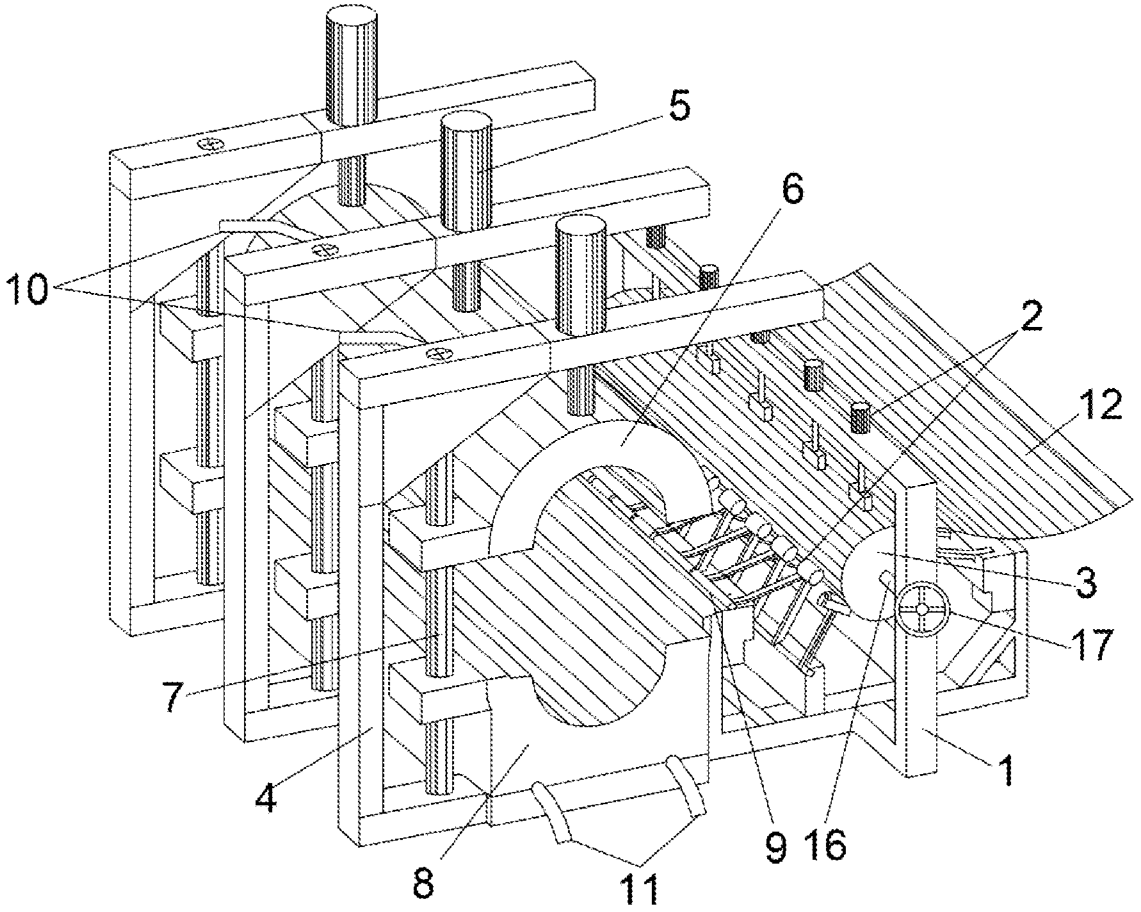
FIG. 1 shows a structural schematic diagram of the forming pressing device provided according to an example of the present disclosure.

As shown in FIG. 1, the forming unit of the present disclosure includes a first rack 1. In the present disclosure, the first rack 1 is used for supporting other parts in the forming unit.

The forming unit provided by the present disclosure includes a pneumatic compression roller subassembly 2 fixedly connected to the first rack 1.

In the present disclosure, the pneumatic compression roller subassembly 2 includes an air cylinder and a rotating wheel, which is fixedly movably connected to a piston rod in the air cylinder. In the present disclosure, the air cylinder is fixedly connected to the first rack 1.

In the present disclosure, the pneumatic compression roller subassembly 2 is used for adjusting the height of the forming die 3 to press the spliced veneer against the surface of the forming die 3.

In the present disclosure, the rotating wheel can rotate. In the present disclosure, the rotating wheel can be used to roll the wound formed body into the pressing unit.

The forming unit provided by the present disclosure includes a forming die 3, which is rotatably connected to the first rack 1 through a center shaft 16 and is fixedly connected to the center shaft 16; the center shaft 16 is rotatably connected to the first rack 1; the forming die 3 is a cylinder die; the pneumatic compression roller subassembly 2 is distributed around a side surface of the forming die 3, and are arranged for winding and forming the spliced veneer around the forming die 3.

As an embodiment of the present disclosure, the center shaft 16 is fixedly connected to a handle 17. In the present disclosure, the handle 17 is arranged for manually rotating the forming die 3.

As an embodiment of the present disclosure, the center shaft 16 is connected to a motor. In the present disclosure, the motor is arranged for electrically controlling the rotation of the forming die 3, and the rotation is autorotation of the forming die 3 along the center shaft 16.

In some embodiments of the present disclosure, the forming die 3 is a steel wrapped column.

In some embodiments of the present disclosure, the forming die 3 has a diameter of 180 mm.

In some embodiments of the present disclosure, the forming die 3 is a solid cylinder die or a hollow cylinder die.

As an embodiment of the present disclosure, when the forming die 3 is the hollow cylinder die, during the hot-pressing curing, a heat medium is introduced into a hollow structure of the forming die 3, and the heat medium includes heat conducting oil or hot steam. In some embodiments, the heat medium has a temperature of 170-220° C., preferably 175-195° C.

In the present disclosure, during the hot-pressing curing, the heat medium is introduced into the hollow structure of the forming die 3 to facilitate efficient heating curing.

In some embodiments, the forming unit provided by the present disclosure includes a rolling wheel row 9, which is arranged for matching with the rotating wheel to roll the wound formed body into the pressing unit.

In some embodiments of the present disclosure, when the formed body is rolled by the rolling wheel row 9 into the second semi-cylindrical pressure groove formed by the lower pressure hot plate 8 of the pressing unit, and the forming unit and the pressing unit are placed close to each other.

In the present disclosure, when the formed body is moved by the forming unit to the second semi-cylindrical pressure groove formed by the lower pressure hot plate 8 of the pressing unit in a mechanical moving manner, and the forming unit and the pressing unit can be placed close to each other or separately.

The pressing unit provided by the present disclosure includes a second rack 4. In the present disclosure, the second rack 4 is arranged for supporting other parts in the pressing unit.

The pressing unit provided by the present disclosure includes a pressurized oil cylinder 5 fixedly connected to the second rack 4. In the present disclosure, the pressurized oil cylinder 5 is arranged for applying pressure to an upper pressure hot plate 6.

The pressing unit provided by the present disclosure includes an upper pressure hot plate 6, which is fixedly connected to a piston rod of the pressurized oil cylinder 5, and the upper pressure hot plate 6 forms the first semi-cylindrical pressure groove. In the present disclosure, a diameter of the first semi-cylindrical pressure groove is the same as that of the second semi-cylindrical pressure groove, and is greater than that of the formed body.

In some embodiments of the present disclosure, a circulation passage for the first heat conducting medium is arranged in the upper pressure hot plate 6.

In some embodiments of the present disclosure, the first heat conducting medium is heat conducting oil or hot steam.

In some embodiments of the present disclosure, the first heat conducting medium has a temperature of 170-200° C., preferably 175-195° C.

The pressing unit provided by the present disclosure includes a support column 7, which is fixedly connected to the second rack 4 and is movably connected to the upper pressure hot plate 6.

In the present disclosure, the support column 7 is arranged for supporting the upper pressure hot plate 6. The support column 7 also plays a role of a guide column, which can ensure that the center of the first semi-cylindrical pressure groove and the center of the second semi-cylindrical pressure groove are on the same straight line perpendicular to the horizontal plane.

The pressing unit provided by the present disclosure includes a lower pressure hot plate 8, which is fixedly connected to the support column 7, and forms the second semi-cylindrical pressure groove.

In some embodiments of the present disclosure, a circulation passage for a second heat conducting medium is arranged in the lower pressure hot plate 8.

In some embodiments of the present disclosure, the second heat conducting medium is heat conducting oil or hot steam.

In some embodiments of the present disclosure, the second heat conducting medium has a temperature of 170-200° C., preferably 175-195° C.

In some embodiments of the present disclosure, the lengths of the upper pressure hot plate 6 and the lower pressure hot plate 8 are equal.

In some embodiments of the present disclosure, the diameter of the first semi-cylindrical pressure groove and the diameter of the second semi-cylindrical pressure groove are equal.

In some embodiments, the pressing unit provided by the present disclosure further includes a first heat conducting medium inlet-outlet pipe 10. In the present disclosure, the first heat conducting medium inlet-outlet pipe 10 communicates with a circulation passage of the first heat conducting medium located in the upper pressure hot plate 6 to introduce the flowing first heat conducting medium into the circulation passage of the first heat conducting medium.

As an embodiment of the present disclosure, the first heat conducting medium inlet-outlet pipe 10 is fixedly connected to the upper pressure hot plate 6.

In some embodiments, the pressing unit provided by the present disclosure further includes a second heat conducting medium inlet-outlet pipe 11. In the present disclosure, the second heat conducting medium inlet-outlet pipe 11 communicates with a circulation passage of the second heat conducting medium located in the lower pressure hot plate 8 to introduce the flowing second heat conducting medium into the circulation passage of the second heat conducting medium.

As an embodiment of the present disclosure, the second heat conducting medium inlet-outlet pipe 11 is fixedly connected to the lower pressure hot plate 8.

In the present disclosure, the lengths of the upper pressure hot plate 6 and the lower pressure hot plate 8 are equal, and when the length of the formed body is greater than that of the upper pressure hot plate 6 or the lower pressure hot plate 8, it is preferable that multiple pressing units are arranged in parallel in a length direction of the formed body, and the formed body is subjected to hot-pressing curing at the same time.

The present disclosure provides a hollow artificial log manufactured by the method as described in the above technical solutions, having a warpage of less than or equal to 5 mm/m.

In some embodiments of the present disclosure, the hollow artificial log has a wall thickness of greater than or equal to 15 mm.

In the present disclosure, an annular wall of the hollow artificial log has a density of 550-850 kg/m$^3$.

In the present disclosure, tests are performed according to the GB50329-2002 *Standard for methods testing of timber structures*, and the hollow artificial log has a modulus of elasticity of 6000-9500 MPa. The hollow artificial log with a length of 3-6 m has a maximum static bending failure load of greater than or equal to 19.8 KN and a static bending strength of greater than or equal to 80 MPa.

In some embodiments of the present disclosure, the hollow artificial log has a compression ratio of 15%.

In some embodiments of the present disclosure, the hollow artificial log has a diameter of 300 mm.

In order to further illustrate the present disclosure, the technical solutions provided by the present disclosure will be described in detail with reference to the drawings and examples, but they should not be understood as limiting the scope of the present disclosure.

Example 1

A fast-growing poplar veneer used in this example of the present disclosure had a dimension of 1200 mm×40 mm×2.0 mm, a density of 450 kg/m$^3$, and a moisture content of 8%.

A plurality of veneers were fed into a veneer splicer, and spliced by the veneer splicer according to long grain in a length direction and according to cross grain in a width direction. During the splicing, seams of the veneers were subjected to misaligned assembly and then spliced, obtaining assembled veneers, and then the assembled veneers were bonded with a hot melt adhesive tape, obtaining a spliced veneer, as shown in FIG. 2. In FIG. 2, 13 represents a veneer, 14 represents a seam, and 15 represents a hot melt adhesive tape. In the spliced veneer, the seams between the veneers in the same row each had a length of 1200 mm, equal to the length of each veneer, a seam spacing between rows of adjacent veneers was about 500 mm, and the spliced veneer had a width of 3 m.

By parts by mass, 100 parts of a formaldehyde aqueous solution with a mass concentration of 37% were adjusted to a pH value of 9.3, mixed with 25 parts of urea and 10 parts of melamine, obtaining a mixture. The mixture was stirred at 25° C. for 25 min at a speed of 75 r/min, then heated to 93° C. and held at 93° C. for 50 min, obtaining a first solution. The first solution was adjusted to a pH value of 7, then held at 93° C. for 100 min, obtaining a second solution. The second solution was adjusted to a pH value of 9, then mixed with 10 parts of melamine at 90° C. for 50 min, obtaining a third solution. The third solution was adjusted to a pH value of 8.5, then mixed with 25 parts of urea at 65° C. for 40 min, obtaining a fourth solution. The fourth solution was naturally cooled to 25° C., obtaining a melamine-urea-formaldehyde copolycondensation resin. The melamine-urea-formaldehyde copolycondensation resin and an ammonium chloride curing agent were used as the adhesive together, wherein a mass of the ammonium chloride accounted for 5% of a mass of the melamine-urea-formaldehyde copolycondensation resin.

The spliced veneer was glued on one side with a movable roller glue spreader, obtaining a glued veneer, and the glue spread had a glue spread amount on one side of 150 g/m$^2$.

Figure 3:
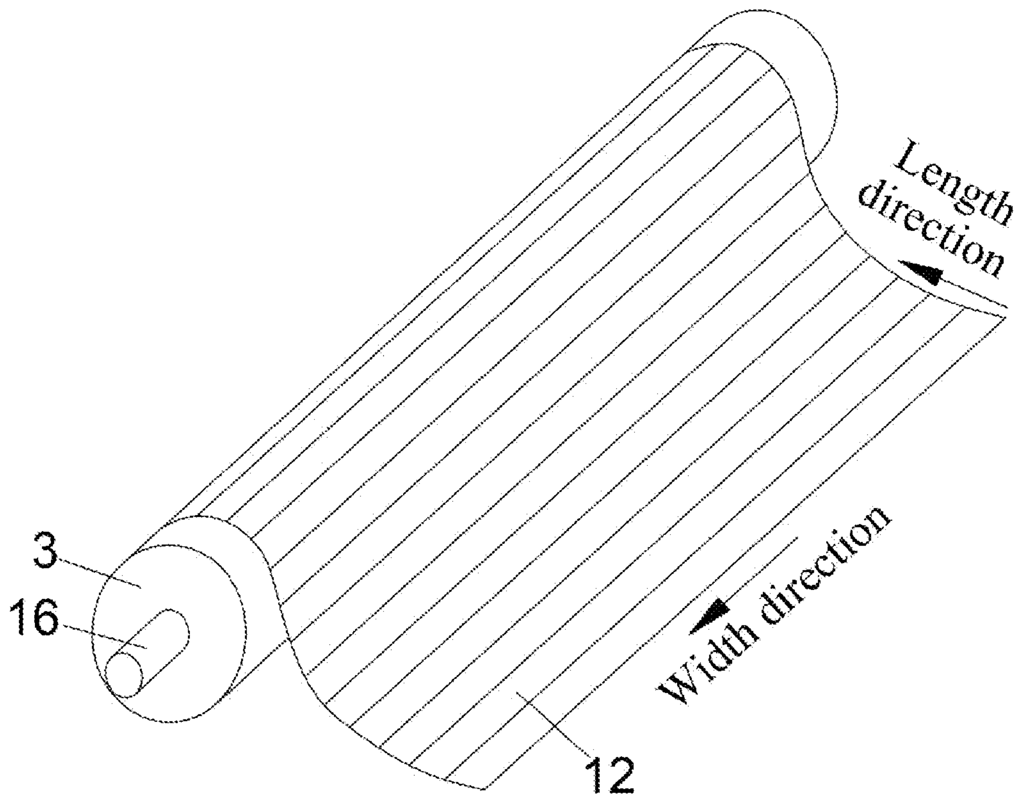
FIG. 3 shows a schematic diagram of the spliced veneer provided according to an example of the present disclosure wound on a surface of a forming die.

The glued veneer was formed with the forming unit in FIG. 1. The forming was performed as follows: A surface of a forming die 3 of the forming unit was coated with a layer of a release agent, then the glued veneer was conveyed to the forming die 3 of the forming unit and subjected to winding and forming under the assistance of a pneumatic compression roller subassembly 2, obtaining a formed body with a diameter of 320 mm. The forming die 3 was a steel-wrapped column with a diameter of 180 mm and a length of 3 m. The schematic diagram of the forming process is shown in FIG. 3.

Under the action of gravity and inertia, the formed body was conveyed from the forming unit to a second semi-cylindrical pressure groove formed by a lower pressure hot plate 8 of the pressing unit (as shown in FIG. 1) through a rotating wheel and a rolling wheel row 9 of the pneumatic compression roller subassembly, then an upper pressure hot plate 6 was driven by a piston rod of a pressurized oil cylinder 5 to move downwards along a support column 7 to contact with a surface of the formed body. Then flowing heat conducting oil was introduced into a circulation passage of a first heat conducting medium in the upper pressure hot plate 6 and a circulation passage of a second heat conducting medium in the lower pressure hot plate 8 through a first heat conducting medium inlet-outlet pipe 10 and a second heat conducting medium inlet-output pipe 11, respectively. The heat conducting oil had a temperature of 180° C., and the surface temperatures of each of the first semi-cylindrical pressure groove and the second semi-cylindrical pressure groove were kept at 180° C. Finally, the formed body was subjected to hot-pressing curing by applying a pressure from the pressurized oil cylinder 5 to the upper pressure hot plate 6, the hot-pressing curing was conducted at a pressure of 3 MPa, and the hot-pressing curing was maintained at the temperature and pressure for 30 min, obtaining a cured body.

After the cured body was cooled, the forming die 3 was taken out, obtaining a hollow artificial log. The hollow artificial log had a warpage of less than or equal to 5 mm/m, a length of 3 m, a diameter of 300 mm, and a wall thickness of 15 mm. An annular wall of the hollow artificial log had a density of 550/m$^3$. Tests were performed according to GB50329-2002 *Standard for methods testing of timber structures*, the hollow artificial log had a modulus of elasticity of 6000 MPa, and the finished product with a length of 3 m had a maximum static bending failure load of 35 KN, and a static bending strength of 80 MPa.

Example 2

A fast-growing eucalyptus veneer used in this example of the present disclosure had a dimension of 1200 mm×40 mm×2.0 mm, a density of 500 kg/m$^3$, and a moisture content of 10%.

A plurality of veneers were fed into a veneer splicer, and spliced by the veneer splicer according to long grain in a length direction and according to cross grain in a width direction. During the splicing, seams of the veneers were subjected to misaligned assembly and then spliced, obtaining assembled veneers, and then the assembled veneers were bonded with a hot melt adhesive tape, obtaining a spliced veneer, as shown in FIG. 2. In FIG. 2, 13 represents a veneer, 14 represents a seam, and 15 represents a hot melt adhesive tape. In the spliced veneer, the seams between the veneers in the same row each had a length of 1200 mm, equal to the length of each veneer, a seam spacing between rows of adjacent veneer was about 500 mm, and the spliced veneer had a width of 6 m.

By parts by mass, 100 parts of a formaldehyde aqueous solution with a mass concentration of 37% were adjusted to a pH value of 9.3, mixed with 25 parts of urea and 10 parts of melamine, obtaining a mixture. The mixture was stirred at 25° C. for 25 min at a speed of 75 r/min, then heated to 93° C. and held at 93° C. for 50 min, obtaining a first solution. The first solution was adjusted to a pH value of 7, then held at 93° C. for 100 min, obtaining a second solution. The second solution was adjusted to a pH value of 9, then mixed with 10 parts of melamine at 90° C. for 50 min, obtaining a third solution. The third solution was adjusted to a pH value of 8.5, then mixed with 25 parts of urea at 65° C. for 40 min, obtaining a fourth solution. The fourth solution was naturally cooled to 25° C., obtaining a melamine-urea-formaldehyde copolycondensation resin. The melamine-urea-formaldehyde copolycondensation resin and an ammonium sulfate curing agent were used as the adhesive together, wherein a mass of the ammonium sulfate accounted for 8% of a mass of the melamine-urea-formaldehyde copolycondensation resin.

The spliced veneer was glued on one side with a glue dispenser, obtaining a glued veneer, and the glue spread had a glue spread amount on one side of 200 g/m$^2$.

The glued veneer was formed with the forming unit in FIG. 1. The forming was performed as follows: A surface of a forming die 3 of the forming unit was coated with a layer of a release agent, then the glued veneer was conveyed to the forming die 3 of the forming unit and subjected to winding and forming under the assistance of a pneumatic compression roller subassembly 2, obtaining a formed body with a diameter of 320 mm. The forming die 3 was a steel-wrapped column with a diameter of 180 mm and a length of 6 m. The schematic diagram of the forming process is shown in FIG. 3.

Under the action of gravity and inertia, the formed body was conveyed from the forming unit to a second semi-cylindrical pressure groove formed by a lower pressure hot plate 8 of the pressing unit (as shown in FIG. 1) through a rotating wheel and a rolling wheel row 9 of the pneumatic compression roller subassembly, then an upper pressure hot plate 6 was driven by a piston rod of a pressurized oil cylinder 5 to move downwards along a support column 7 to contact with a surface of the formed body. Then flowing heat conducting oil was introduced into a circulation passage of a first heat conducting medium in the upper pressure hot plate 6 and a circulation passage of a second heat conducting medium in the lower pressure hot plate 8 through a first heat conducting medium inlet-outlet pipe 10 and a second heat conducting medium inlet-output pipe 11, respectively. The heat conducting oil had a temperature of 200° C., and the surface temperatures of each of the first semi-cylindrical pressure groove and the second semi-cylindrical pressure groove were kept at 200° C. Finally, the formed body was subjected to hot-pressing curing by applying a pressure from the pressurized oil cylinder 5 to the upper pressure hot plate 6, the hot-pressing curing was conducted at a pressure of 2 MPa, and the hot-pressing curing was maintained at the temperature and pressure for 30 min, obtaining a cured body.

After the cured body was cooled, the forming die 3 was taken out, obtaining a hollow artificial log. The hollow artificial log had a warpage of less than or equal to 5 mm/m, a length of 6 m, a diameter of 300 mm, and a wall thickness of 20 mm. An annular wall of the hollow artificial log had a density of 600/m$^3$. Tested were perfomed according to GB50329-2002 *Standard for methods testing of timber structures*, the hollow artificial log had a modulus of elasticity of 9000 MPa, and the finished product with a length of 6 m had a maximum static bending failure load of 19.8 KN, and a static bending strength of 83 MPa.

Example 3

A *Pinus sylvestris* veneer used in this example of the present disclosure had a dimension of 1200 mm×40 mm×2.0 mm, a density of 480 kg/m$^3$, and a moisture content of 10%.

A plurality of veneers were fed into a veneer splicer, and spliced by the veneer splicer according to long grain in a length direction and according to cross grain in a width direction. During the splicing, seams of the veneers were subjected to misaligned assembly and then spliced, obtaining assembled veneers, and then the assembled veneers were bonded with a hot melt adhesive tape, obtaining a spliced veneer, as shown in FIG. 2. In FIG. 2, 13 represents a veneer, 14 represents a seam, and 15 represents a hot melt adhesive tape. In the spliced veneer, the seams between the veneers in the same row each had a length of 1200 mm, equal to the length of each veneer, a seam spacing between rows of adjacent veneer was about 500 mm, and the spliced veneer had a width of 6 m.

By parts by mass, 100 parts of a formaldehyde aqueous solution with a mass concentration of 37% were adjusted to a pH value of 9.3, mixed with 25 parts of urea and 10 parts of melamine obtaining a mixture. The mixture was stirred at 25° C. for 25 min at a speed of 75 r/min, then heated to 93° C. and held at 93° C. for 50 min, obtaining a first solution. The first solution was adjusted to a pH value of 7, then held at 93° C. for 100 min, obtaining a second solution. The second solution was adjusted to a pH value of 9, then mixed with 10 parts of melamine at 90° C. for 50 min, obtaining a third solution. The third solution was adjusted to a pH value of 8.5, then mixed with 25 parts of urea at 65° C. for 40 min, obtaining a fourth solution. The fourth solution was naturally cooled to 25° C., obtaining a melamine-urea-formaldehyde copolycondensation resin. The melamine-urea-formaldehyde copolycondensation resin and a vinyl acetate emulsion curing agent were used as the adhesive together, wherein a mass of the vinyl acetate emulsion accounted for 4% of a mass of the melamine-urea-formaldehyde copolycondensation resin.

The spliced veneer was glued on one side with a glue sprayer, obtaining a glued veneer, and the glue spread had a glue spread amount on one side of 100 g/m$^2$.

The glued veneer was formed with the forming unit in FIG. 1. The forming was performed as follows: A surface of a forming die 3 of the forming unit was coated with a layer of a release agent, then the glued veneer was conveyed to the forming die 3 of the forming unit and subjected to winding and forming under the assistance of a pneumatic compression roller subassembly 2, obtaining a formed body with a diameter of 320 mm. The forming die 3 was a steel-wrapped column with a diameter of 180 mm and a length of 6 m. The schematic diagram of the forming process is shown in FIG. 3.

Under the action of gravity and inertia, the formed body was conveyed from the forming unit into a second semi-cylindrical pressure groove formed by a lower pressure hot plate 8 of the pressing unit (as shown in FIG. 1) through a rotating wheel and a rolling wheel row 9 of the pneumatic compression roller subassembly, then an upper pressure hot plate 6 was driven by a piston rod of a pressurized oil cylinder 5 to move downwards along a support column 7 to contact with a surface of the formed body. Then flowing heat conducting oil was introduced into a circulation passage of a first heat conducting medium in the upper pressure hot plate 6 and a circulation passage of a second heat conducting medium in the lower pressure hot plate 8 through a first heat conducting medium inlet-outlet pipe 10 and a second heat conducting medium inlet-output pipe 11, respectively. The heat conducting oil had a temperature of 200° C., and the surface temperatures of each of the first semi-cylindrical pressure groove and the second semi-cylindrical pressure groove were kept at 200° C. Finally, the formed body was subjected to hot-pressing curing by applying a pressure from the pressurized oil cylinder 5 to the upper pressure hot plate 6, the hot-pressing curing was conducted at a pressure of 2 MPa, and the hot-pressing curing was maintained at the temperature and pressure for 30 min, obtaining a cured body.

After the cured body was cooled, the forming die 3 was taken out, obtaining a hollow artificial log. The hollow artificial log had a warpage of less than or equal to 5 mm/m, a length of 6 m, a diameter of 300 mm, and a wall thickness of 20 mm. An annular wall of the hollow artificial log had a density of $650/m^3$. Tested were perfomed according to GB50329-2002 *Standard for methods testing of timber structures*, the hollow artificial log had a modulus of elasticity of 9500 MPa, and the finished product with a length of 6 m had a maximum static bending failure load of 23 KN, and a static bending strength of 95 MPa.

Although the present disclosure has been described in detail by the above embodiments, but those are only a part, not all of the embodiments of the present disclosure. It should be understood that other embodiments can be obtained without creativity according to these embodiments, all of which are within the scope of the present disclosure.

What is claimed is:

1. A method for manufacturing a hollow artificial log, comprising:

splicing and fixing veneers along a length direction and a width direction, respectively, to obtain a spliced veneer;

gluing the spliced veneer on one side to obtain a glued veneer;

subjecting the glued veneer to winding and forming around a forming die along a length direction of the glued veneer to obtain a formed body;

subjecting the formed body to hot-pressing curing in a hot-pressing die to obtain a cured body; and taking out the cured body from the forming die to obtain the hollow artificial log;

wherein an adhesive for the gluing comprises a melamine-urea-formaldehyde copolycondensation resin, and the forming die is a cylinder.

2. The method of claim 1, wherein the hot-pressing curing is conducted at a pressure of 1.5-5 MPa; during the hot-pressing curing, the hot-pressing die is at a temperature of 170-200° C.; and the hot-pressing curing is maintained at the pressure and the temperature for 20-30 min.

3. The method of claim 1, wherein the melamine-urea-formaldehyde copolycondensation resin is prepared by copolycondensation reaction of melamine, urea and formaldehyde; a mass of the melamine accounts for 20-25% of a total mass of the urea and melamine; and the melamine-urea-formaldehyde copolycondensation resin has a solid content of 60-65%.

4. The method of claim 1, wherein the adhesive further comprises a curing agent; the curing agent comprises one or more selected from the group consisting of ammonium chloride, ammonium sulfate, vinyl acetate emulsion, vinyl acetate copolymer emulsion, and isocyanate; and a mass of the curing agent accounts for 3-10% of a mass of the melamine-urea-formaldehyde copolycondensation resin.

5. The method of claim 1, wherein the glued veneer has a glue spread amount on the one side of 100-200 $g/m^2$.

6. The method of claim 1, wherein the veneers each have a density of 450 $kg/m^2$, a thickness of 1.5-2.5 mm, and a moisture content of less than or equal to 10%.

7. The method of claim 1, wherein under a condition of splicing along the length direction, the veneers are spliced according to a long grain; and under a condition of splicing along the width direction, the veneers are spliced according to a cross grain.

8. The method of claim 1, wherein gluing the spliced veneer on the one side is conducted by a movable roller glue spreader, a glue dispenser, or a glue sprayer.

9. A forming pressing device used in the method for manufacturing the hollow artificial log of claim 1, comprising a forming unit, arranged for forming the spliced veneer to obtain the formed body; and a pressing unit, arranged for subjecting the formed body to the hot-pressing curing to obtain the cured body, wherein the forming unit comprises:

a first rack;

a pneumatic compression roller subassembly fixedly connected to the first rack; and a forming die, which is rotatably connected to the first rack through a center shaft and is fixedly connected to the center shaft; the center shaft is rotatably connected to the first rack; the forming die is a cylinder die; the pneumatic compression roller subassembly is distributed around a side surface of the forming die, and are arranged for winding and forming the spliced veneer around the forming die;

the pressing unit comprises:

a second rack;

a pressurized oil cylinder fixedly connected to the second rack;

an upper pressure hot plate, which is fixedly connected to a piston rod of the pressurized oil cylinder, and forms a first semi-cylindrical pressure groove;

a support column, which is fixedly connected to the second rack and is movably connected to the upper pressure hot plate; and a lower pressure hot plate, which is fixedly connected to the support column and forms a second semi-cylindrical pressure groove;

and wherein the second semi-cylindrical pressure groove is opposite to the first semi-cylindrical pressure groove.

10. A hollow artificial log manufactured by the method of claim 1, having a warpage of less than or equal to 5 mm/m.

11. The method of claim 2, wherein the melamine-urea-formaldehyde copolycondensation resin is prepared by copolycondensation reaction of melamine, urea and formaldehyde; a mass of the melamine accounts for 20-25% of a total mass of the urea and melamine; and the melamine-urea-formaldehyde copolycondensation resin has a solid content of 60-65%.

12. The method of claim 6, wherein under a condition of splicing along the length direction, the veneers are spliced according to a long grain; and under a condition of splicing along the width direction, the veneers are spliced according to a cross grain.

13. The method of claim 5, wherein gluing the spliced veneer on the one side is conducted by a movable roller glue spreader, a glue dispenser, or a glue sprayer.

14. The forming pressing device of claim 9, wherein the hot-pressing curing is conducted at a pressure of 1.5-5 MPa; during the hot-pressing curing, the hot-pressing die is at a temperature of 170-200° C.; and the hot-pressing curing is maintained at the pressure and the temperature for 20-30 min.

15. The forming pressing device of claim 9, wherein the melamine-urea-formaldehyde copolycondensation resin is prepared by copolycondensation reaction of melamine, urea and formaldehyde; a mass of the melamine accounts for 20-25% of a total mass of the urea and melamine; and the melamine-urea-formaldehyde copolycondensation resin has a solid content of 60-65%.

16. The forming pressing device of claim 9, wherein the adhesive further comprises a curing agent; the curing agent comprises one or more selected from the group consisting of ammonium chloride, ammonium sulfate, vinyl acetate emulsion, vinyl acetate copolymer emulsion, and isocyanate; and a mass of the curing agent accounts for 3-10% of a mass of the melamine-urea-formaldehyde copolycondensation resin.

17. The forming pressing device of claim 9, wherein the glued veneer has a glue spread amount on the one side of 100-200 $g/m^2$.

18. The forming pressing device of claim 9, wherein the veneers each have a density of 450 $kg/m^2$, a thickness of 1.5-2.5 mm, and a moisture content of less than or equal to 10%.

19. The forming press device of claim 9, wherein under a condition of splicing along the length direction, the veneers are spliced according to a long grain; and under a condition of splicing along the width direction, the veneers are spliced according to a cross grain.

20. The forming pressing device of claim 9, wherein gluing the spliced veneer on the one side is conducted by a movable roller glue spreader, a glue dispenser, or a glue sprayer.

* * * * *